Dec. 21, 1937. L. E. SHAW Re. 20,599
DISPLAY DEVICE
Original Filed April 13, 1932 2 Sheets-Sheet 1
Fig. 1,
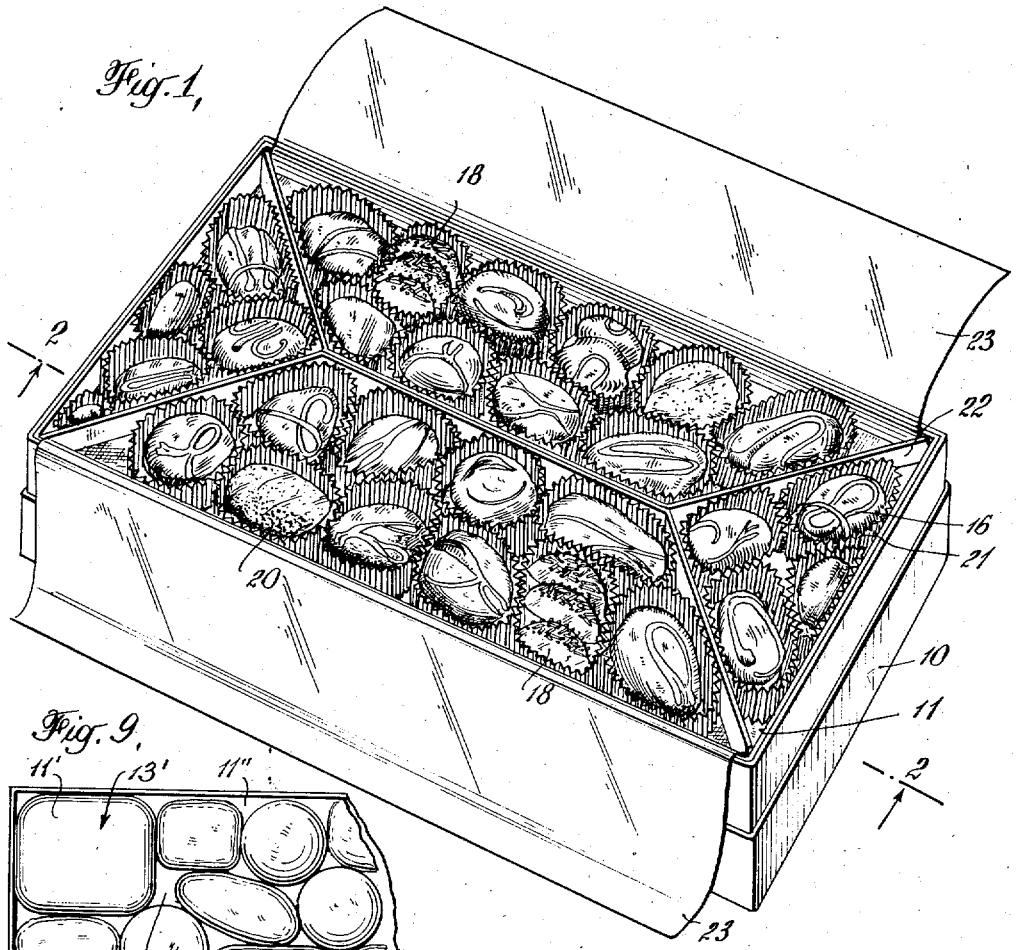
Fig. 9,
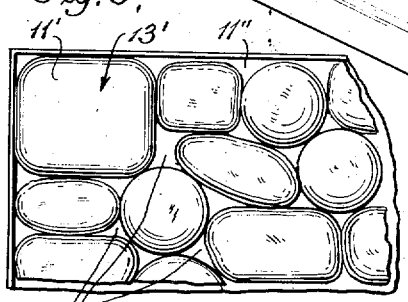
Fig. 2,
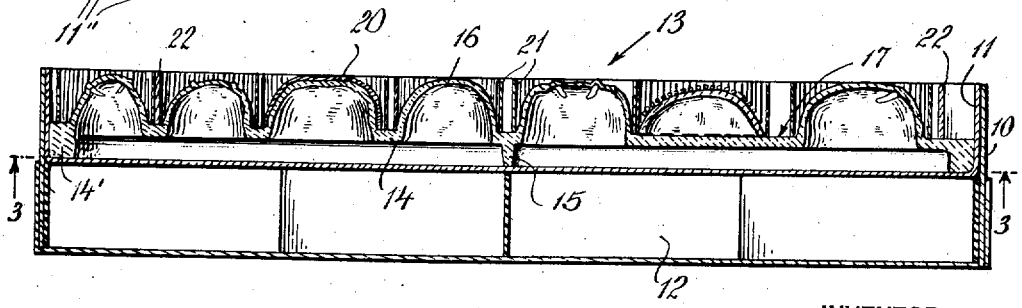
INVENTOR
Louis E. Shaw
BY
Pennie Davis Marvin & Edmonds
ATTORNEYS Dec. 21, 1937. L. E. SHAW Re. 20,599

DISPLAY DEVICE

Original Filed April 13, 1932 2 Sheets-Sheet 2

INVENTOR
Louis E. Shaw
BY
Parris, Davis, Bond & Stone
ATTORNEYS

Reissued Dec. 21, 1937 Re. 20,599

UNITED STATES PATENT OFFICE 20,599

DISPLAY DEVICE

Louis E. Shaw, East Orange, N. J., assignor to Adartcraft, Incorporated, New York, N. Y., a corporation of Delaware Original No. 1,968,915, dated August 7, 1934, Serial No. 604,930, April 13, 1932. Application for reissue December 20, 1935, Serial No. 55,431

39 Claims. (Cl. 40—126)

This invention relates to display devices and has particular reference to a member adapted to be arranged in a package or container to simulate or represent the articles usually packed therein so as to create the impression that a package or container of the actual merchandise is being displayed.

It is a common practice among dealers in packaged merchandise to open one or more of the packages to expose the articles of merchandise packed therein and then to place the open packages in a prominent place or position where their contents can be readily seen by prospective purchasers. Dealers in cigars, cigarettes, confections, and the like follow this practice, placing opened boxes of cigars, cigarettes, chocolates and other candies on a counter, or in a show case or window, or other prominent location. Many of the articles are perishable, especially chocolates, which are not only subject to deterioration because of dust and insects, but also become coated with an objectionable film of cocoa butter when subjected to heat, so that they cannot thereafter be sold. Cigars exposed in open boxes are also liable to deterioration by drying out.

Furthermore, in order to provide a substantial display of the packaged merchandise, the dealer must have on hand a larger stock of the merchandise than he ordinarily expects to sell and if the merchandise on display becomes damaged a considerable loss is entailed. This practice is accordingly expensive and generally unsatisfactory.

In accordance with the present invention, a mat or plaque, which simulates exactly the top layer or upper surface of the articles of merchandise displayed when the package is opened, is provided and is adapted to be used in substitution for the original articles of merchandise in the package, so that the actual merchandise is not subjected to deterioration and is not required in a quantity which makes provision for display. The new mat or plaque is formed with or bears representations of the articles of merchandise so arranged as to simulate the top row or layer of the salable articles as they appear in the container or package in which they are packed and sold. Thus, the plaque bears three-dimensional representations of cigars, cigarettes, candies or the like, which follow the exact configuration, coloring and general appearance of the actual articles of merchandise which they are adapted to replace, so that the simulation is substantially perfect and cannot be detected by the average casual observer.

The plaque is preferably molded from plastic material and is in the form of a base having a plurality of projections rising from it which are spaced one from another and whose shape, size, contour and surfacing conform exactly to those of the articles to be simulated, and rings of crimped paper are placed around the several projections, filling the spaces between adjacent projections and between the several projections and the surrounding wall of the container and having their lower edges bearing upon the top surface of the base. In this way it is possible to simulate packages of merchandise with pronounced fidelity in a form which is much less expensive than the genuine article both as to its initial cost and as to the period of time over which it may be used.

The invention is of special value in the provision of display devices for use in connection with the sale of candy, though it is not limited to that use, as it is well adapted for use in connection with other articles such as small cakes which are sometimes sold in shallow boxes containing a single layer of individual cakes, or small stacks of thin cakes, biscuits or the like. Some of the features of the invention may also be used in simulating articles which are not ordinarily packaged in paper cups of the kind commonly used as receptacles for confections, cakes, biscuits and the like. For instance, a plaque may be made in the manner indicated to simulate the top layer or cigars in a box by molding a plaque of the appropriate contour from plastic moldable material, applying bands to the imitation cigars of the plaque and applying cellophane to them. In such cases the height of the molded projections should be considerable with reference to the thickness of the simulated articles and the sides of the projections extending down to the base should be substantially transverse to the plane of the base in which case the simulation of the genuine articles will be much more pronounced.

When the invention is used in connection with the sale of chocolate candies, a particularly attractive display may be provided. The plaque of molded material may be given a color which is practically indistinguishable from that of the chocolates by incorporating coloring into the moldable material or by applying coloring to the finished plaque as with an air brush. Also, the dies by which the plaque is formed may be made directly from a box of chocolates so that every detail of the contour and surface conformation of each candy will be directly reproduced in the corresponding projection of the plaque. When a plaque so formed has rings of crimped paper applied to the projection and filling the spaces between adjacent projections and between the outer projections and the surrounding wall of the container, the simulation is complete. These rings of crimped paper surrounding projections present identically the same appearance as the paper cups with crimped edges in which individual chocolates are placed by putting them in a tray or box.

The idea underlying the invention is susceptible of wide use in simulating a variety of practices commonly used by candy manufacturers. For instance, sometimes it is desirable to simulate a box of candies containing some special confection which cannot readily be reproduced in making the plaque in a form sufficiently accurate and attractive. As an example, sometimes a box of candies has in the top row one or more nuts like almonds, and in some instances flaked chocolate is applied to a portion of the surface of such a nut. As the almond nut is rather thin for its size, it is common to place three such nuts side by side and the contour presented by three such nuts cannot readily be simulated in molding the plaque with the desired accuracy. In this situation and those of similar character, the plaque may be prepared with one or more areas thereon free from any projection and then separately formed imitations of nuts or other confections to be displayed may be secured on any such flat area by a suitable adhesive, whereupon the crimped paper ring is applied around these in the usual manner. In any such instance the imitation nut may have imitation flaked chocolate applied directly to it by dipping a portion of its area into adhesive material and thereafter dipping it in a supply of flaked material.

Boxes of chocolates frequently have some few candies enclosed in foil. When using the display device constituting this invention, the same appearance can be presented by applying a piece of foil over a projection on the plaque so that its edges extend down close to the base. Then when the paper rings are placed around all of the projections including the one covered by the foil, the appearance presented will exactly duplicate the genuine article.

In instances where the individual confections are packed in the tray or box without employing the paper cups, so that the bottom of the tray or box is visible, the spaces on the plaque between the individual representations of the confections are either left open so that the bottom of the tray or box is visible; or the base of the plaque between the representations is colored white, or the like, to simulate the color of the bottom of the tray or box; or, if the representations are relatively widely spaced apart, a cardboard mask having apertures the shape of the representations is placed over them and rests upon the base of the plaque.

These and other features of the invention will be better understood by reference to the following description in connection with the accompanying drawings illustrating the embodiment of the invention at present preferred.

Figure 1 illustrates in perspective a box containing the new display device of this invention in the form of a representation of the top layer of candies as they are usually packed in the box;

Fig. 2 is a cross-section thereof as seen along the line 2—2 of Fig. 1;

Figs. 8 and 9 illustrate modified forms of the display device of this invention.

Figure 3:
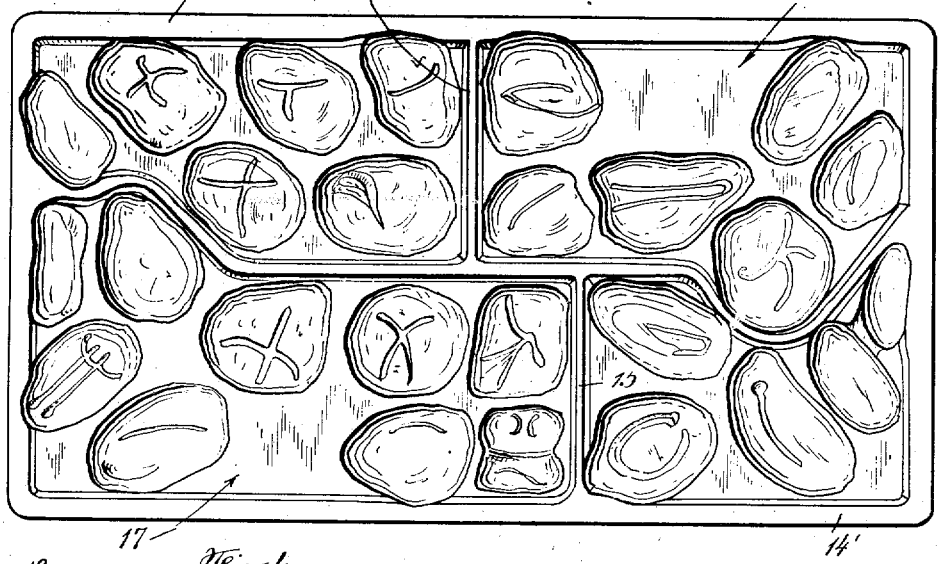
Fig. 3 is a rear view of the plaque of the display device.

Referring to the drawings, numeral 10 designates the usual cardboard box in which candy is packed, this box being of the size adapted to contain two or more layers of candy, at least the top layer of which is placed in a cardboard tray 11. As the box 10 is not intended to carry the usual heavy merchandise simulated, it is within the scope of the disclosure also to simulate the box in which the real articles are contained by making box 10 of the same appearance as the real box and without the structural strength required of the real box. The box 10 includes two upstanding cardboard members 10*a* and 10*b* to provide a double thickness of card board material at opposite ends of the box 10. In the simulated box of candy including this invention, the tray 11 may be conveniently supported in its proper position in the upper part of the box 10 by means of the cardboard support 12 or the like. The support 12 includes two upstanding end elements 12*a* and 12*b* which support the end edges of the shelf and abut the inner faces of the box end forming members 10*a* and 10*b* to provide a double thickness of cardboard material to the lower end portions of the box, in downward continuation of the tray flanges 11*b* and 11*c*. In smaller boxes, such as half pound boxes of candy, of course the support 12 will not be necessary, since the candy is packed in only one layer, and the tray 11 will not be used in the one-layer box.

Resting in the tray 11 is the plaque 13 representing the individual candies arranged in the manner in which they are packed in the tray 11. This plaque 13 is formed in one piece and is preferably molded from suitable initially plastic material by means of dies or the like, preferably constructed from the actual candies as patterns or models, so that the representations of the candies are exactly like the actual candies. This plaque 13 includes a base 14 having stiffening flanges 14′ and ribs 15 on its under or rear surface for rendering the plaque rigid and preventing warping or bending.

Embossed or otherwise formed on the upper surface of the base 14 are the representations 16 of the individual candies arranged with respect to each other as they appear in the actual box of candy, and having the exact surface configuration of the actual pieces of candy. As shown especially in Figs. 2 and 4, these individual representations or embossings 16 are spaced from each other so that the simulation of individual pieces of candy is heightened to a considerable degree.

The height of the individual representations 16 above the base 14 of the plaque is less than the height of the actual candies above the bottom of the tray 11, and this arrangement provides a space between the base 14 of the plaque and the bottom of the tray 11 for the stiffening flange 14′ and the ribs 15. Although the representations 16 are lower than the actual candies which they simulate, the substantially vertical sides of the representations 16 adjacent base 14 of the plaque give the illusion of height and this illusion, together with the rounded tops of the individual representations 16, produce an appearance of depth and shadow precisely like the appearance of depth and shadow produced by the original candies.

Boxes of candies, such as chocolates, usually contain several groups of individual small pieces, such as coated nuts and the like. The places on the plaque corresponding to the places occupied by these groups of candies in the layer of chocolates is left unembossed on the plaque 13, so that flat spaces are formed between the adjacent representations 16, as indicated at 17 in Figs. 2, 3, 4 and 5. Preferably employing the actual smaller individual confections as models or patterns, representations 18 thereof are molded or otherwise formed from suitable material, one of these individual representations being illustrated in Fig. 6.

Figure 4:
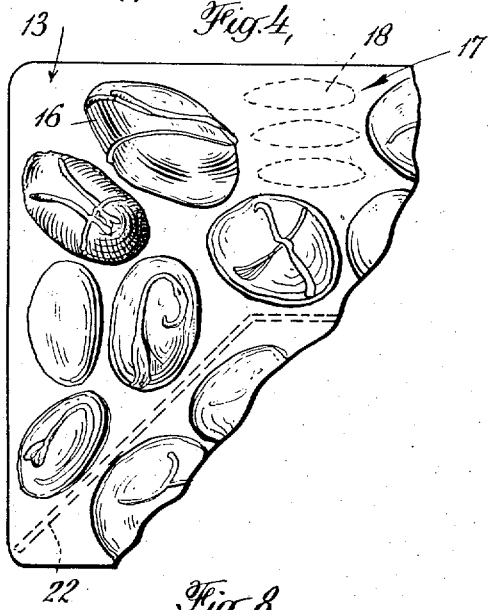
Fig. 4 is a partial top view thereof.
Figure 5:
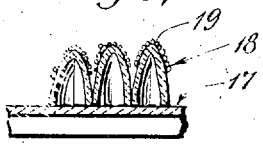
Fig. 5 illustrates individual representations of confections secured on the base of the plaque.

These individual representations 18 are either placed upon the flat spaces 17 on the plaque 13 individually, or in groups of two or three or more in conformance to the number and arrangement of the actual confections represented thereby, as is illustrated by Figs. 1 and 5 and indicated by the dotted outlines in Fig. 4. These individual representations 18 are preferably secured to the surface of the areas 17 by a suitable adhesive so that they cannot be dislodged. In this way the small pieces of candy, which are usually arranged in groups in the actual candy box, and are difficult to imitate, are faithfully represented by the individual molds arranged on the plaque in exactly the same way as the actual candies are arranged in the box.

The surfaces of the individual representations 16 and 18 are prepared to simulate exactly the coloring and texture of the actual candies. This is preferably done by appropriately painting or lacquering the surfaces of the individual representations 18 to conform to the coloring and texture of the actual candies. In many instances the plastic material from which the plaque 13 or the separate representations 18 are made is of the color of one or more of the confections. For example, the hardened plastic from which the separate representations 18 are made is the color of an uncoated almond or other nut. Also, the plastic material itself may be suitably colored so that when it hardens it has the coloring of the actual candy.

Figure 6:
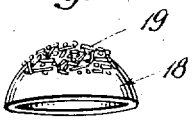
Fig. 6 illustrates in perspective a representation of an individual candy.

Many of the actual candies are distinctive in appearance because of special coatings or surface materials mounted thereon and these distinctive appearances are reproduced precisely in the plaque of the new display device. For example, as shown in Figs. 5 and 6, portions of the surfaces of the almond representations 18 are partially coated with granular material which closely resembles the shredded cocoanut on the actual almonds. To obtain this effect, a partial coating of glue is applied to the surfaces of the representations 18 and a granular material 19 applied to the glued area, and this material may then be colored to represent a coating of chocolate or the like if the actual almonds are so coated. Also, certain of the individual candies are frequently wrapped in tin-foil or the like, and in order to simulate such candies the corresponding individual representation 16 on the plaque 13 is coated with a layer of tin foil or other sheet or coating material, as is indicated at 20 in Figs. 1 and 2.

Figure 7:
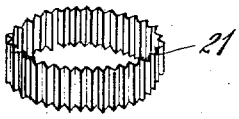
Fig. 7 is an illustration in perspective of one of the bottomless paper cups or rings which encircles each representation of individual candies or the representation of groups of pieces of candy.

Encircling each individual representation 16 and the groups of separate representations 18 is a corrugated paper ring or bottomless cup 21, shown in perspective in Fig. 7, and simulating the individual paper cups in which the actual candies are usually placed. These rings 21 are preferably secured to the upper surface of the base 14 of the plaque by means of an adhesive, or the coating material of the plaque, such as lacquer, may be softened by a few drops of solvent placed between the individual representations 16 so that the lower edges of the rings 21 are secured to the base 14 when the coating material again hardens. The separate representations 18 may also be secured to the appropriate flat areas 17 of the base 14 in this way.

In addition to reproducing the actual candies, their individual surface coatings and the paper cups in which they are placed, other distinguishing characteristics of the actual candy box may be simulated in the same way. For example, as shown in Fig. 1 and indicated in Fig. 4, cardboard separators or partitions 22 may be inserted between the candies or chocolates and secured to the base of the plaque by an adhesive or by softening the coating material thereof, and sheets of tin-foil 23 or the like may be inserted under the edges of the plaque 13 before it is placed in the tray 11 and the like.

In some instances the confections are packed in the tray or box without being placed in the individual paper cups, so that the bottom of the box or tray is not obscured by the paper cups but is visible through the spaces between the individual confections. In order to simulate the bottom of the tray in such a case, the flat upper surface of the base 14 of the plaque is painted white or other color to simulate the bottom of the tray or box, so that the representations appear to be resting directly upon the bottom of the tray or box.

Figure 8:
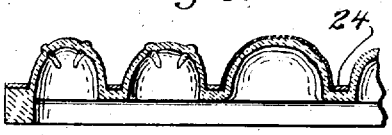

If the individual confections are relatively widely spaced apart so that each one is substantially surrounded by a flat area of the plaque base, a mask 24 of cardboard, or the like, having the dimensions of the bottom of the tray or box, so as to fit closely therein, and having the color thereof, and provided with apertures the size of the individual representations, is placed over the plaque and rests on the base thereof as is illustrated in Fig. 8. This mask accordingly simulates the bottom of the tray or box and the individual representations appear to be resting directly upon the bottom of the tray or box.

This illustration may be procured in another way, i. e., by leaving the spaces 11'' between the individual representations open on the plaque 13', so that the bottom of tray box 11' is visible, as is illustrated in Fig. 9. The plaque 13' is particularly advantageous when the confections forming the layer which the plaque simulates are packed closely so that adjacent confections touch. The individual representations accordingly support each other by their interconnections so that, though the plaque is made integrally, a distinct base is not necessary, since the representations are connected at their points of contact adjacent their bases.

In preparing the new display device for use, the plaque 13 is placed in the cardboard tray 11, with or without the sheets of tin-foil 23 inserted under the edges of the plaque, a suitable support 12 placed in the box 10, and the tray inserted in the upper part of the box 10 on the support 12. The display device then appears as illustrated in Fig. 1 and is ready for display instead of the actual boxes of candy which are usually used for display purposes. If it is desired to display a one-layer box of candy, the plaque 13 is placed directly in the box 10 instead of in the tray 11.

The new display device has been illustrated and described as representing a particular package of merchandise, but it will be understood that the plaque may be formed and otherwise prepared to represent the various articles of merchandise which are vended in packages, and that the several forms of individual representations may be used separately or in combinations in the same display device.

I claim:

1. A display device, comprising a base, and a plurality of elevated members secured thereon with substantially large areas of the base exposed between certain of the members, for the reception of individual members, said members representing the articles to be displayed.

2. A display device, comprising a base, and a plurality of members embossed thereon in representation of the individual articles to be displayed, a portion of the base being unembossed for receiving individual articles to be displayed on the base in association with the embossed members.

3. A display device, comprising a base, and a plurality of members embossed thereon in representation of the individual articles to be displayed, a portion of the base being unembossed, and a separate member on the unembossed portion of the base for display in association with the embossed members thereof.

4. A display device, comprising a base, and a plurality of members embossed thereon in representation of the individual articles to be displayed, a portion of the base being unembossed, and a separately formed member representing an article to be displayed secured to the unembossed portion of the base for display in association with the embossed members thereof.

5. A display device, comprising a base, a plurality of separate elevated members secured on the base in representation of the individual articles to be displayed, and partition elements resting on the base.

6. A display device, comprising a base, a plurality of separate elevated members secured on the base in representation of the individual articles to be displayed, and paper rings encircling substantially each of the members and resting on the base.

7. A display device, comprising a base, a plurality of separate elevated members secured on the base in representation of the individual articles to be displayed, and paper rings encircling substantially each of the members and secured at one edge of the base.

8. A display device, comprising a base, a plurality of separate elevated members secured on a base in representation of the individual articles to be displayed, individual members mounted on the base between certain of the other members, and partition elements between certain of the members.

9. A display device, comprising a base, a plurality of separate elevated members secured on the base in representation of the individual articles to be displayed, a group of individual elements mounted on the base between certain of the other members, and partition elements resting on the base.

10. A display device, comprising a plaque of molded plastic material mounted in a container, said plaque consisting of a base and integral projections rising therefrom and spaced one from another and shaped to correspond to the simulated article, and rings of crimped paper each encircling one of the several projections with the lower edge of each ring upon the upper surface of the base, the several rings substantially filling the spaces between the several projections and between the projections and the surrounding wall of the container.

11. A display device, comprising a plaque of molded plastic material mounted in a container, said plaque consisting of a base and integral projections rising therefrom and spaced one from another and shaped to correspond to the simulated article, and said plaque also having one or more flat areas between projections, and a separately formed simulation of an article to be displayed secured to the base in each of said flat areas, and rings of crimped paper each encircling one of the integral projections and the separately formed simulations with the lower edge of each ring upon the upper surface of the base, the several rings filling the spaces between the several projections and between the projections and the surrounding wall of the container.

12. A display device comprising a plaque of molded plastic material consisting of a base and integral projections rising from the base a distance constituting a substantial portion of the thickness of the simulated article, with the sides of adjacent projections near the base close together and substantially transverse to the plane of the base, and a container in which the plaque is mounted with the top of the projections close to the plane of the top of the container.

13. A display device comprising a plurality of elevated representations of the individual articles to be displayed connected together at their points of contact adjacent their bases and having openings between and defined by the representations adjacent their points of contact, said representations being smaller in size than any overall dimension of the device, certain of the openings being wholly surrounded by the representations and being spaced from the outer edges of the device and a support for the said connected representations which is visible through the openings between the representations.

14. A display device comprising a base, a plurality of representations of the individual articles to be displayed on the base, and a sheet of material perforated to correspond to the contours and relative locations of said representations and resting on the base in the spaces between the representations and having a color contrasting with the color of the representations.

15. A display device comprising a base, a plurality of representations of the individual articles to be displayed projecting upwardly from the base, and a sheet of material shaped to conform to the contours of the representations adjacent the surface of the base and overlying the latter.

16. In a display device, the combination of a one-piece plaque having its exposed side defined by a plurality of separate domes, each including an endless side wall rounding into a crown and said walls interconnected at their bases to form a unitary structure, the side walls of one of the domes encircled by a tubular ring with the crown of the dome so encircled exposed through the open top of the ring and the exposed crown of the dome so exposed fashioned to simulate the article intended to be displayed by the part of the device encircled.

17. A display device comprising a base, a plurality of separate elevated members supported from the base in representation of the individual articles to be displayed and said members being integrally connected at their lower edges and partition elements between certain of the members.

18. A display device comprising a plurality, not less than three, of representations of the individual articles to be displayed, said representations being integrally connected to each other at least at one point of their respective bases, said representations coacting to form therebetween an open top space and means integral with the respesentations defining the bottom of said space and simulating part of a support for the representations.

19. A display device intended for use in substitution for articles of commerce in a package without being subjected to deterioration, said device comprising a plaque of plastic material including dome-like protuberances, each simulating in its conformation and coloring an article of commerce, one of said protuberances partially coated on its exposed side with a layer of small particles of granulated material closely resembling the granular material usually used on the article simulated adhering to the exposed side with the surface of the protuberances so coated exposed through the interstices formed between the particles and thus simulating an article of commerce so partially coated.

20. A display device including a support, a plaque of molded plastic material resting on the support and including a plurality of upwardly extending embossments, each fashioned to represent the upper portion of an article of commerce, the lower ends of the embossments located in a plane spaced a short distance above the support, and said plaque including strengthening elements located in the space between the planes defined by the bottoms of the embossments and the top of the support, each of said embossments extending above the support a distance equal to the height of the article represented by each particular embossment.

21. A device of the class described, comprising a plaque including a base having a plurality of embossments projecting integrally upwardly therefrom and with certain of the adjacent embossments being of at least two different shapes spaced apart to expose therebetween portions of the base having such irregular shapes, when viewed in plan, as may be given to these exposed portions by the peculiarities in configuration of the walls of the embossments forming the same, each embossment having the requisite configuration and coloring to simulate an article of commerce, and the exposed portions of the base having a color different from the color or colors of the embossments and simulating the support on which the real articles represented are supported.

22. In a device of the class described, the combination of a plaque of plastic material having a nut-like color, said plaque including a plurality of protuberances simulating the top layer of a box of chocolate candies, same of the protuberances having the conformation of a piece of chocolate candy, and another protuberance having the conformation of a piece of chocolate candy with a nut embedded in its upper surface, the exposed surface of said other protuberance having a chocolate coloring except in the part which represents the nut and the exposed surface of said nut-representing part being formed of the plastic material and the color of the basic plastic material of which the plaque is formed giving to this nut representing part the color of the nut represented.

23. In a device of the class described, the combination of an open top box, a tray fitting within said box a three dimensional plastic plaque fitting within the tray, said plaque simulating a top layer of merchandise, and a sheet of covering material having one edge inserted under an edge of the plaque, located between the plaque and tray and held in place by the weight of the plastic plaque and having another edge portion projecting from the space between the plaque and tray and adapted to be folded over the plaque.

24. A display device for simulating a box of candy with an upper layer of cholocate candies exposed, comprising an open top box, a paper tray fitted in said box, a plastic cast fitted in the tray, and including an outlining stiffening flange, an internal stiffening rib, a plurality of hollow dome-like protuberances having their upper convexed surfaces spaced from each other and each simulating a piece of chocolate candy, and a crimped paper ring forming a bottom-less cup encircling certain of the protuberances to cause them to simulate a cupped piece of chocolate.

25. A display device for simulating a box of candy with an upper layer of chocolate candies exposed, comprising an open top box, a paper tray fitted in said box, a plastic cast fitted in the tray, and including an outlining stiffening flange, an internal stiffening rib, and a plurality of hollow dome-like protuberances having their upper convexed surfaces spaced from each other and each simulating a piece of chocolate candy.

26. A device of the class described comprising a plaque including a plurality of spaced apart hollow embossments arranged in line and secured in a flat layer to simulate the arrangement in which the articles represented by the embossments are usually displayed, said embossments relatively arranged to provide the usual open spaces between the adjacent articles represented when displayed and thus give the appearance of depth to the embossments and a covering applied to the upper exposed portion of certain of the embossments to simulate the articles when wrapped in a covering material.

27. In a display device, the combination of a plurality of units projecting upwardly from a plane of reference and interconnected in spaced relation to their upper ends to form a unitary structure, the upper exposed surface of each of said units simulating an article separate from every other article thus simulated, and a layer of wrapping material extending upwardly along the sides and across the top of the exposed surface of one of said units to completely cover the unit and thus simulate a wrapped unit and said layer being confined to the unit covered thereby leaving the next adjacent units uncovered to simulate unwrapped articles.

28. A display device including two distinct hollow units each simulating one of the solid real articles which the device is intended to display, said simulating units arranged in juxtaposition and fixedly secured relative to each other, said units having open bottoms disposed in a common plane and having closed tops, the upper portion of the units including the closed tops and the adjacent portions of their side walls being fixedly spaced apart, each of said upper portions having a configuration simulating the similar upper portion of an article, and two separate layers of wrapping material, one for each unit and each layer completely surrounding the side wall of its associated unit and said layers contacting with each other in the space between the units.

29. A non-perishable display device for maintaining its original color under service conditions comprising a base of plastic material, a molded hollow dome-like representation of the upper portion of an article, means for securing the lower bottom edge of the representation of the base, and a mass of separate relatively small particles adhering to the upper exposed surface of the dome-like representation.

30. In a device of the class described, the combination of a base of plastic material, a molded hollow dome-like representation of the upper portion of an article, and means for securing the lower bottom edge of the representation to the base, and said base supporting the hollow representation and closing the open bottom of the same.

31. In a device of the class described, the combination of a base of plastic material, a molded hollow dome-like representation of the upper portion of an article, means for securing the lower bottom edge of the representation to the base, a mass of separate relatively small particles adhering to the upper exposed surface of the dome-like representation, said particles having a color distinguishing from the color of said exposed surface of the representation.

32. A display device including an elevated hollow plastic dome-like member substantially symmetric relative to a vertically extending axis and representing an individual article to be displayed, an upstanding paper ring encircling said elevated member coaxially therewith and with the top of the elevated member exposed to view through the open top of the ring, and means for securing the ring in place.

33. In the art of forming a representation of a piece of chocolate candy having a surface coating of granular material, the method which consists in forming from initially plastic material having a chocolate color a representation of a piece of chocolate candy, applying a coating of glue to a limited area of the upper exposed surface of the chocolate colored representation, applying to the glued area while wet a sprinkling of granular material and permitting the glue to harden and thus secure the granular material in place.

34. In the art of forming a representation of a nut having a layer of chocolate coated shredded cocoanut thereon, the method which consists in forming from initially plastic material having a nut-like color a representation of a nut, applying a coating of glue to the upper portion of the representation, applying a granular material to the glued area and applying a coating of a chocolate color to the granular material.

35. In the art of forming representations of a piece of candy contained in a paper cup, the method which consists in forming from initially plastic material a representation of the piece of candy, coating the same with a layer of soluble lacquer to give the representation the desired color, applying a few drops of a solvent for the lacquer to the portion of the lacquer which is about the base of the representation to soften the lacquer momentarily at this place, locating a paper ring about the representation with its lower edge pressed in engagement with the lacquer so softened and permitting the softened lacquer to reharden and thus secure the paper ring in place.

36. A display device simulating a piece of chocolate candy adapted to be assembled with other similar devices to simulate the top layer of a box of candies, said device comprising an initially plastic body having an upstanding endless side face rounding at its upper portion into a dome-like top surface, said top surface being embossed to simulate the surface of a piece of the real chocolate candy simulated by the device and an open top paper cup in which the body is contained and the bottom of the body being permanently secured to the bottom of the paper cup.

37. A display device for simulating an open top box of merchandise exposing a plurality of separate vendable articles arranged as such articles are commonly displayed, comprising two upstanding outer cardboard members simulating opposite sides of the real article containing box, a horizontal rectangular layer of cardboard forming a shelf, fitted between said side members, a cardboard support including two vertically extending end elements abutting the inner sides of the two upstanding cardboard members and thus providing a double thickness of cardboard supporting opposite edges of said horizontal layer, a plurality of separate hollow embossings, each embossing representing one of the simulated articles and having top portions and sides rounding downwardly from the top portions, means engaging the embossings at their lower edges to tie them together and for securing the same in their relatively fixed relation to the shelf and said upstanding cardboard box endlike forming members projecting above the cardboard layer a distance sufficient to bring the top edges of the end forming members approximately to the plane containing the top portions of the embossings, thereby to protect the hollow representations adjacent thereto.

38. A display device for simulating an open top box of merchandise exposing a plurality of separate vendable articles arranged as such articles are commonly displayed and at least one of which is wrapped, said device including cardboard end walls simulating the end walls of the box of the real articles, a piece of cardboard fitting between said end walls, having a horizontally extending portion and integral end portions bent at right angles to the horizontally extending portion and abutting the inner sides of said cardboard end walls thereby providing at least a double layer of cardboard at opposite ends of the device, means positioned on the horizontally extending portion of the piece of cardboard forming a plurality of hollow three-dimensional representations of the articles, each representation located entirely above the shelf being of substantially inverted U-shape in one cross section therethrough and a covering for one of the hollow representations extending across the top and down opposite sides, confined to the representations which it covers and simulating a wrapped real article.

39. A display device for simulating a box of separate vendable articles at least one of which is wrapped, means forming a simulation of the top layer of the real articles in the box, said means including a plurality of representations of the real articles, at least one of said representations being hollow and substantially inverted U-shape in cross section to give the appearance of the depth of the real article and a layer of flexible wrapping material extending at least across the top and downwardly along opposite sides of said representation to simulate one of the wrapped real articles and said layer confined to and not extending materially beyond the single representation which it covers.

LOUIS E. SHAW.